(12) United States Patent
Nakai et al.

(10) Patent No.: US 10,676,030 B2
(45) Date of Patent: Jun. 9, 2020

(54) VEHICLE EXTERIOR CAMERA DEVICE

(71) Applicant: KABUSHIKI KAISHA TOKAI-RIKA-DENKI-SEISAKUSHO, Aichi (JP)

(72) Inventors: Toshinari Nakai, Aichi (JP); Tomonori Ichikawa, Aichi (JP); Hidetaka Nomura, Aichi (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 3 days.

(21) Appl. No.: 16/061,567

(22) PCT Filed: Nov. 30, 2016

(86) PCT No.: PCT/JP2016/085650
§ 371 (c)(1),
(2) Date: Jun. 12, 2018

(87) PCT Pub. No.: WO2017/110397
PCT Pub. Date: Jun. 29, 2017

(65) Prior Publication Data
US 2018/0361935 A1    Dec. 20, 2018

(30) Foreign Application Priority Data

Dec. 21, 2015    (JP) .................. 2015-248899

(51) Int. Cl.
*B60R 1/06*    (2006.01)
*B60R 11/04*    (2006.01)
(Continued)

(52) U.S. Cl.
CPC ................ *B60R 1/06* (2013.01); *B60R 11/04* (2013.01); *G03B 15/00* (2013.01); *G03B 17/02* (2013.01);
(Continued)

(58) Field of Classification Search
CPC ... B60R 1/06; B60R 11/04; B60R 2001/1253; H04N 5/225
See application file for complete search history.

(56) References Cited

U.S. PATENT DOCUMENTS

| 2006/0171704 | A1* | 8/2006 | Bingle | ................... B60R 11/04 396/419 |
| 2007/0051646 | A1 | 3/2007 | Imoto et al. | |

(Continued)

FOREIGN PATENT DOCUMENTS

| DE | 102011113323 A1 | 5/2012 |
| EP | 2692585 A1 | 2/2014 |

(Continued)

OTHER PUBLICATIONS

International Search Report and Written Opinion issued in the corresponding application PCT/JP2016/085650 dated Feb. 21, 2017.

*Primary Examiner* — Ahmed A Berhan
(74) *Attorney, Agent, or Firm* — Roberts Calderon Safran & Cole P.C.

(57) ABSTRACT

At an imaging device, a camera that captures images is housed in an outer cover and is provided at a vehicle exterior, and captures images of the vehicle exterior via a cover lens that is provided at an outer wall. A step portion, which causes an outer peripheral surface that is at the outer wall side to protrude-out further than an outer peripheral surface that is at a side opposite the outer wall, is provided at an outer peripheral surface of the outer cover.

15 Claims, 4 Drawing Sheets

(51) Int. Cl.
  *G03B 15/00*  (2006.01)
  *G03B 17/02*  (2006.01)
  *H04N 5/225*  (2006.01)
  *B60R 1/12*  (2006.01)

(52) U.S. Cl.
  CPC ...... *H04N 5/225* (2013.01); *B60R 2001/1253* (2013.01)

(56) References Cited

U.S. PATENT DOCUMENTS

| | | | |
|---|---|---|---|
| 2011/0267466 A1 | 11/2011 | Brester | |
| 2015/0138357 A1* | 5/2015 | Romack | H04N 7/185 348/148 |

FOREIGN PATENT DOCUMENTS

| | | |
|---|---|---|
| EP | 2851243 A1 | 3/2015 |
| JP | 2007-062670 A | 3/2007 |
| JP | 2009-286216 A | 12/2009 |
| JP | 2009-290527 A | 12/2009 |
| JP | 2010-078978 A | 4/2010 |
| JP | 2010-177837 A | 8/2010 |
| JP | 2013-009211 A | 1/2013 |
| JP | 2013-109188 A | 6/2013 |
| JP | 2015-207020 A | 11/2015 |
| WO | 2005/094063 A1 | 10/2005 |

\* cited by examiner

VEHICLE EXTERIOR CAMERA DEVICE

CROSS-REFERENCE TO RELATED APPLICATIONS

The present application is a U.S. National Phase of PCT/JP2016/085650 filed on Nov. 30, 2016 claiming priority to Japanese Patent Application No. 2015-248899 filed Dec. 21, 2015. The disclosure of the PCT Application is hereby incorporated by reference into the present Application.

TECHNICAL FIELD

The present invention relates to an imaging device that is provided at an exterior of a vehicle.

BACKGROUND ART

A structure in which a cover glass is provided at an end wall of a housing that houses a camera, and the camera captures images via the cover glass, is disclosed in Japanese Patent Application Laid-Open (JP-A) No. 2009-286216.

By the way, there are cases in which water droplets that stick to the peripheral surface of the housing flow on the surface of the cover glass as the vehicle travels. There are cases in which the water droplets that flow on the surface of the cover glass are displayed in the images captured by the camera.

SUMMARY OF INVENTION

Technical Problem

The present invention was made in view of the above-described circumstances, and an object thereof is to provide an imaging device that can suppress the flowing of water droplets on an outer peripheral surface of an outer peripheral member toward an outer wall, accompanying the traveling of a vehicle.

Solution to Problem

In order to achieve the above-described object, a first aspect of the present disclosure includes: an imaging portion provided at a vehicle exterior; an outer peripheral member at which is provided an outer wall at which a light transmitting portion is disposed, and that houses the imaging portion that captures images via the light transmitting portion; and a step portion that is provided at an outer peripheral surface of the outer peripheral member, and that causes the outer peripheral surface of the outer peripheral member that is at the outer wall side to protrude-out further than the outer peripheral surface of the outer peripheral member that is at a side opposite the outer wall.

The first aspect of the present disclosure has the outer peripheral member that houses the imaging portion. The step portion, which causes the outer peripheral surface at the outer wall side to protrude-out further than the outer peripheral surface at the side opposite the outer wall, is provided at the outer peripheral surface of the outer peripheral member. The step portion suppresses flowing of water droplets, which flow on the peripheral surface of the outer peripheral member, from the outer peripheral surface, which is at the side of the step portion opposite the outer wall, toward the outer peripheral surface that is at the outer wall side.

In a second aspect of the present disclosure, a bent portion, which is bent such that the outer wall is directed toward a vehicle rear side, is formed at the outer peripheral member, and the step portion is provided at the bent portion of the outer peripheral member.

In the second aspect of the present disclosure, the outer wall is directed toward the vehicle rear side due to the bent portion that is formed at the outer peripheral member, and imaging of the vehicle rear side is possible. The step portion is provided at the bent portion of the outer peripheral member, and flowing of water droplets toward the outer wall side is suppressed by the bent portion.

In a third aspect of the present disclosure, a groove portion or a projecting portion that structures the step portion is provided at the outer peripheral member.

In the third aspect of the present disclosure, the groove portion or the projecting portion that structures the step portion is provided. Due thereto, in order to provide the step portion at the outer peripheral member, there is no need to make the outer peripheral surface that is at the outer wall side protrude-out further than the outer peripheral surface that is at the side opposite the outer wall side, with respect to the groove portion or the projecting portion.

In a fourth aspect of the present disclosure, the step portion is provided over an entire periphery of the outer peripheral surface of the outer peripheral member.

In the fourth aspect of the present disclosure, the step portion is provided over the entire periphery of the outer peripheral surface of the outer peripheral member. Therefore, water droplets flowing from the outer peripheral surface, which is at the side opposite the outer wall, toward the outer peripheral surface that is at the outer wall side is suppressed over the entire periphery of the outer peripheral member.

Advantageous Effects of Invention

In accordance with the present invention, water droplets, which are on the outer peripheral surface of the outer peripheral member, flowing toward the outer wall side as the vehicle travels is suppressed. Therefore, there is the excellent effect that captured images being spoiled by water droplets is suppressed.

DESCRIPTION OF EMBODIMENTS

Figure 1A:
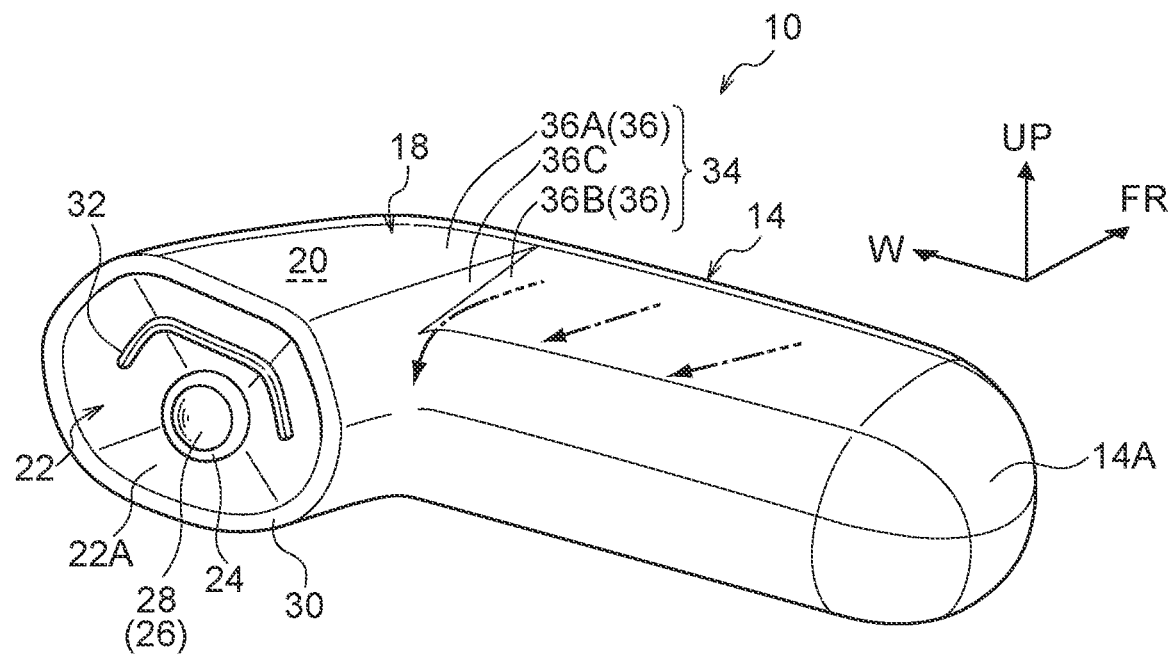
FIG. 1A is a schematic perspective view of main portions, showing an imaging device relating to a present embodiment.
Figure 1B:
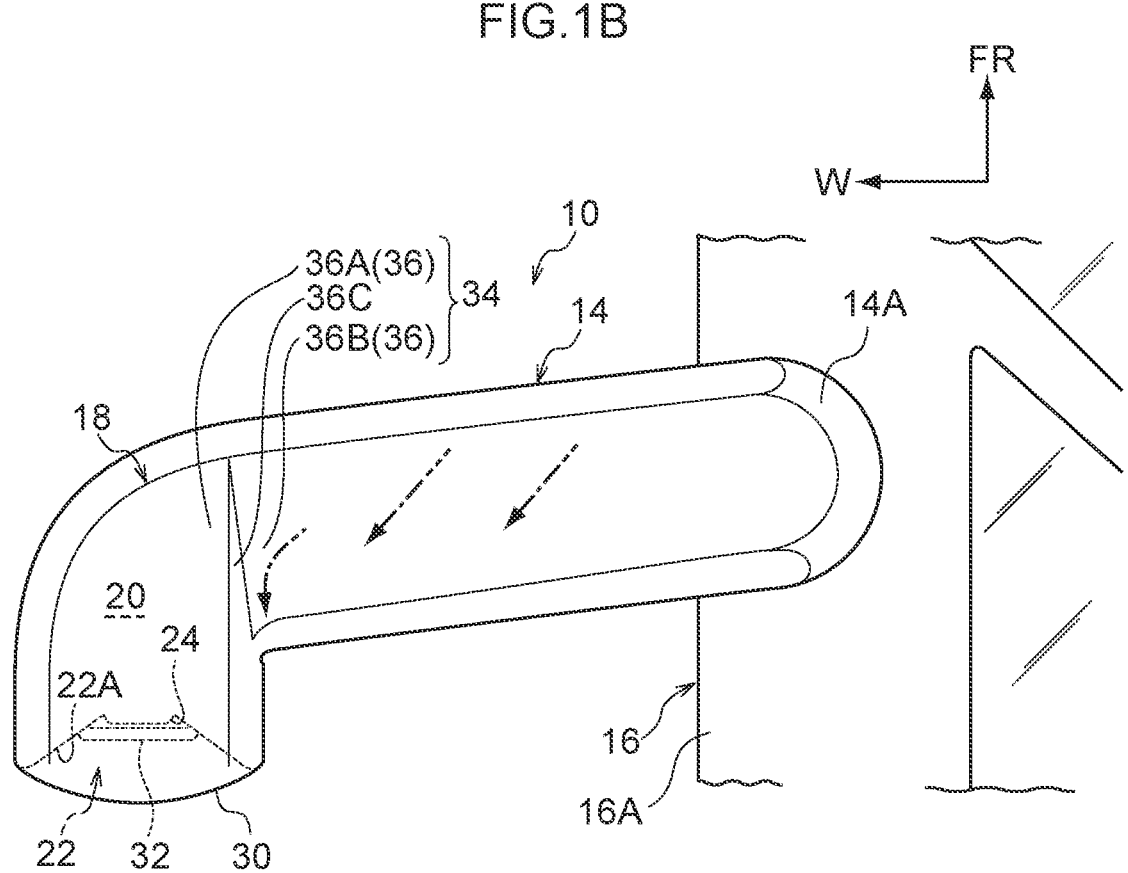
FIG. 1B is a schematic plan view of main portions, showing the imaging device relating to the present embodiment.
Figure 2:
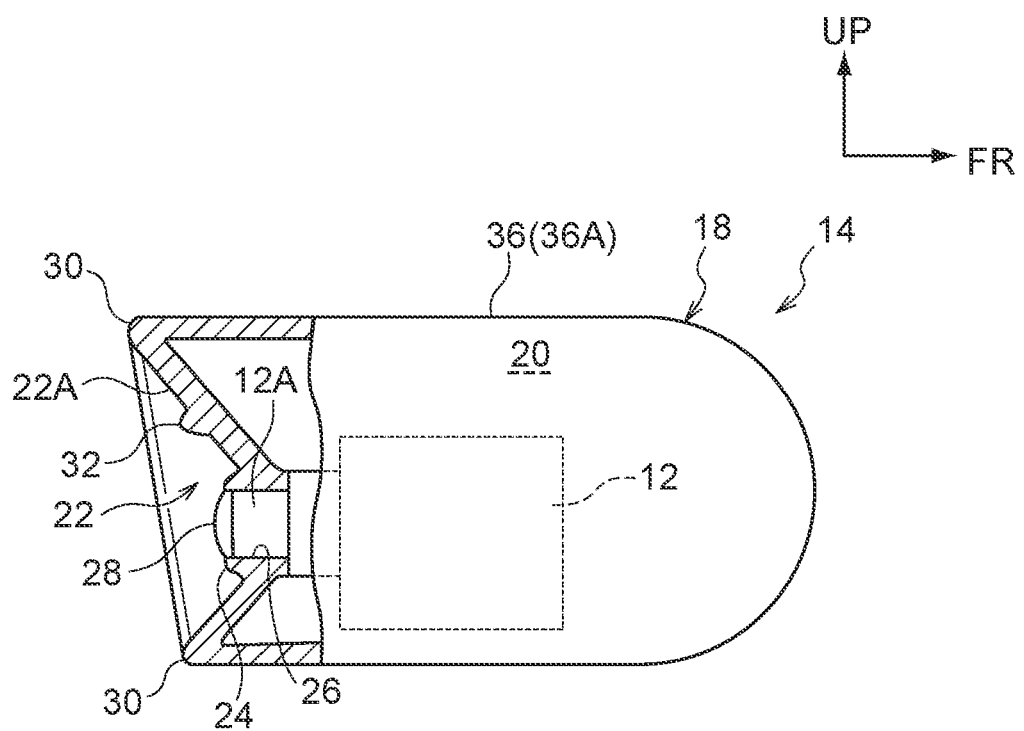
FIG. 2 is a cross-sectional view of main portions, showing an imaging portion that is formed at an outer cover.

An embodiment of the present invention will be described in detail hereinafter with reference to the drawings. An imaging device 10 relating to a present embodiment is shown in FIG. 1A and FIG. 1B. A schematic cross-section of main portions of the imaging device 10 is shown in FIG. 2. In the present embodiment, the imaging device 10 that is provided at a vehicle such as a passenger vehicle or the like is described. Note that, in the following explanation, the vehicle forward side is denoted by arrow FR, the vehicle transverse direction outer side is denoted by arrow W, and the vehicle upward side is denoted by arrow UP.

As shown in FIG. 2, the imaging device 10 has a camera 12 that serves as an imaging portion. An imaging element such as, for example, a CCD (Charge Coupled Device) or a CMOS (Complementary Metal Oxide Semiconductor) image sensor or the like is used as the camera 12, and a general structure that outputs electrical signals that correspond to images (projected images) that are image-formed at the imaging element is applied.

In the present embodiment, projected images of the vehicle exterior are captured by the camera 12 of the imaging device 10 that is disposed at the exterior of the vehicle. The images that are captured by the camera 12 are displayed, for example, on an unillustrated monitor that is provided within the vehicle cabin. Due thereto, the imaging device is used instead of a rearview mirror such as a door mirror or the like, or together with a rearview mirror, in assisting viewing of the exterior of the vehicle by the driver or the like who is in the vehicle cabin.

As shown in FIG. 1A and FIG. 1B, the imaging device 10 has an outer cover 14 that serves as an outer peripheral member. The outer cover 14 is formed in the shape of a tube whose interior is hollow, and the camera 12 is housed at the interior thereof. Note that, in the present embodiment, description is given with the axial direction of the outer cover 14 being the length direction of the outer cover 14. However, the length of the outer cover 14 in the length direction may be shorter than the length thereof in the direction (the radial direction) that is orthogonal to the length direction. Further, in the present embodiment, the outer cover 14 is shaped as a tube, but the outer cover 14 that serves as the outer peripheral member is not limited to the shape of a tube, and an arbitrary shape may be applied thereto provided that the outer cover 14 is a shape that is such that the camera 12 can be housed therein.

As shown in FIG. 1B, a length direction one end side (hereinafter called base portion 14A side) of the outer cover 14 is mounted to a side door (a front side door) 16A of a vehicle 16, and the other end side extends from the side door 16A toward the vehicle transverse direction outer side. Note that, in the present embodiment, the outer cover 14 is mounted to the side door 16A such that the distal end side (the side opposite the base portion 14A side) is slightly inclined toward the vehicle rear side with respect to the vehicle transverse direction.

As shown in FIG. 1A and FIG. 1B, a curved portion 18 serving as a bent portion is formed at the outer cover 14. The distal end side which is at the side opposite the vehicle 16 is directed toward the vehicle rear side by the curved portion 18. As shown in FIG. 2, the distal end portion (including the curved portion 18) of the outer cover 14 is an imaging portion 20, and the camera 12 is housed at the interior of the imaging portion 20.

An outer wall 22 whose surface is directed toward the vehicle rear side is provided at the distal end of the outer cover 14 that is directed toward the vehicle rear side. The outer cover 14 is closed-off by the outer wall 22 at the imaging portion 20. As shown in FIG. 1A and FIG. 2, a protruding portion 24 is formed at the outer wall 22 at the central portion of an outer surface 22A that is directed toward the rear of the vehicle. A through-hole 26, that serves as a light transmitting portion and is a circular hole that passes-through the outer wall 22, is formed in the protruding portion 24. Note that, in the present embodiment, the through-hole 26 is formed as a circular hole, but may be a polygonal shape such as quadrangular or pentagonal, or an arbitrary shape such as an oval shape or the like can be applied thereto.

The camera 12 has a trunk portion 12A, and an optical system and the like are housed within the trunk portion 12A. The trunk portion 12A is inserted in the through-hole 26, and the camera 12 is mounted to the imaging portion 20. Further, a lens or a cover glass that covers the lens (hereinafter a cover glass 28 as an example), which serves as a light transmitting member, is mounted to the distal end of the trunk portion 12A, and the through hole 26 is closed-off by the cover glass 28. Due to the trunk portion 12A being mounted in the through-hole 26 of the outer wall 22, the imaging region of the camera 12 is directed toward the vehicle rear side, and imaging of a predetermined region that is at the vehicle rear side is possible. Note that the optical axis of the camera 12 is directed slightly toward the vehicle transverse direction outer side. Further, although the trunk portion 12A of the camera 12 is inserted in the through-hole 26 in the present embodiment, the present invention is not limited to this, and an arbitrary form in which the camera 12 passes-through the through-hole 26 and images the vehicle rear side can be applied. For example, there may be a form in which the opening side of the through-hole 26 is open without the trunk portion 12A being inserted in the through-hole 26 up to the point that the cover glass 28 is exposed. In this case, the through-hole 26 may be closed-off by a protecting member that is light-transmissive and is provided separately from the cover glass 28.

As shown in FIG. 1A and FIG. 2, the outer wall 22 is inclined from the peripheral edge of the protruding portion 24 toward the peripheral edge portion of the outer wall 22, such that the outer surface 22A is a concave shape. Namely, the outer surface 22A side of the outer wall 22 is formed in a concave shape such that the peripheral edge portion of the outer wall 22 is further toward the vehicle rear side than the protruding portion 24. The outer cover 14 forms an edge portion 30 that projects-out toward the vehicle rear side from the outer wall 22 at the peripheral edge of the outer wall 22.

Due thereto, the outer wall 22 is inclined in a substantially conical shape in which the outer surface 22A at the upper side of the protruding portion 24 is directed downward and the outer surface 22A at the lower side of the protruding portion 24 is directed upward, and the periphery of the outer wall 22 is surrounded by the edge portion 30. Note that, as shown in FIG. 2, the edge portion 30 is inclined slightly downward such that the vehicle upper side thereof is at the vehicle rear side.

Further, as shown in FIG. 1A and FIG. 2, a projection 32 is provided at the outer wall 22, between the protruding portion 24 and the edge portion 30. As shown in FIG. 2, the distal end, which projects-out from the outer surface 22A of the outer wall 22 that is directed obliquely downward, of the projection 32 is positioned further toward the outer side (the vehicle rear side) than the surface of the cover glass 28. Further, as shown in FIG. 1A, the projection 32 is formed over substantially one-half of the periphery at the periphery of the protruding portion 24, between the protruding portion 24 and the edge portion 30.

On the other hand, as shown in FIG. 1A and FIG. 1B, a step portion 34 is provided at the imaging device 10 at an outer peripheral surface 36 of the outer cover 14. The step portion 34 is provided in the peripheral direction of the outer cover 14 at the outer peripheral surface 36 that is at the vehicle upper side of the outer cover 14. Namely, the step portion 34 is formed so as to be continuous in the peripheral direction of the outer peripheral surface 36 that corresponds to the peripheral direction of the outer wall 22, at the outer peripheral surface 36 of the outer cover 14 that surrounds the outer wall 22. At the outer cover 14, the outer peripheral surface 36 that is at the vehicle upper side is divided by the step portion 34 into an outer peripheral surface 36A that is at the outer wall 22 side, and an outer peripheral surface 36B that is at the base portion 14A side that is the side opposite the outer wall 22.

The step portion 34 is continuous with the outer wall 22 (the edge portion 30) side of the outer peripheral surface 36 of the outer cover 14, and can be located at an arbitrary position and disposed at an arbitrary orientation, provided that the step portion 34 is at a position that is such that it can narrow the surface over which water droplets flow toward the outer wall 22 side. In the present embodiment, the step portion 34 is provided so as to be continuous in the vehicle longitudinal direction at the curved portion 18 as seen in a plan view. Namely, the step portion 34 is provided so as to extend from the inner side in the curvature radial direction of the curved portion 18 toward the outer side in the curvature radial direction of the curved portion 18 that is the peripheral direction of the outer cover 14. Note that, in the following explanation, the peripheral direction of the outer peripheral surface 36 means the direction around the length direction of the outer cover 14 (the direction around the axis), and the length direction of the outer cover 14 at the curved portion 18 runs along the curvature peripheral direction of the curved portion 18.

The outer cover 14 is curved such that the outer peripheral surface 36 at the upper side is, at the peripheral direction central portion, flat or projects-out slightly upward, and is inclined toward the vehicle lower side at the peripheral direction both end sides. At the outer peripheral surface 36 that is at the upper side of the outer cover 14, the step portion 34 is formed such that an outer peripheral surface 36B, which is at the base portion 14A side (the vehicle 16 side) that is the side opposite the outer wall 22, is lower than an outer peripheral surface 36A that is at the outer wall 22 side. Namely, as shown in FIG. 1A, the step portion 34 is formed such that the outer peripheral surface 36A protrudes-out more than the outer peripheral surface 36B. Further, a wall surface 36C that connects the outer peripheral surface 36A and the outer peripheral surface 36B is formed at the step portion 34. The wall surface 36C may be formed in a direction running along the vehicle vertical direction, but, in the present embodiment, is inclined so as to be a preset angle with respect to the vehicle vertical direction. Due thereto, the outer cover 14 is formed so as to climb-up the wall surface 36C from the outer peripheral surface 36B and reach the outer peripheral surface 36A.

At the imaging device 10 that is structured as described above, the camera 12 that is directed toward the vehicle rear side is housed in the imaging portion 20 that is at the vehicle transverse direction outer side of the outer cover 14 that is mounted to the side door 16A of the vehicle 16. Due thereto, the imaging device 10 captures images of the vehicle rear side by the camera 12 of the imaging portion 20.

At the imaging device 10, due to the outer cover 14 being provided at the vehicle exterior, water droplets stick to the outer peripheral surface 36 of the outer cover 14. As the vehicle travels, the water droplets that stick to the outer peripheral surface 36 of the outer cover 14 flow along the outer peripheral surface 36 of the outer cover 14. Further, at the outer peripheral surface 36 of the outer cover 14, portions that have become wet due to water droplets flowing thereon become flow paths, and it becomes easy for water droplets to flow therealong. The directions in which the water droplets flow on the outer peripheral surface 36 of the outer cover 14 vary in accordance with the vehicle speed, the shape of the outer peripheral surface 36 of the outer cover 14, the airflow at the periphery of the outer cover 14, and the like. There are cases in which the water droplets flow on the outer peripheral surface 36 of the outer cover 14 toward the outer wall 22.

Here, at the imaging device 10, the step portion 34 is provided at the outer peripheral surface 36 of the outer cover 14. The step portion 34 is formed such that the outer peripheral surface 36A, which is at the imaging portion 20 side (the outer wall 22 side) of the outer cover 14, protrudes-out from the outer peripheral surface 36B that is at the side opposite the imaging portion 20. When the water droplets, which flow along the outer peripheral surface 36B of the outer cover 14 toward the outer wall 22 side of the imaging portion 20, reach the step portion 34, flowing of the water droplets toward the outer peripheral surface 36A is suppressed by the wall surface 36C that is inclined toward the outer peripheral surface 36A that is further toward the upper side than the outer peripheral surface 36B.

Due thereto, the water droplets that flow on the outer peripheral surface 36B, for example, flow-down the outer peripheral surface 36 (the outer peripheral surface 36B) of the outer cover 14 along the step portion 34 and along the peripheral direction. At this time, the water droplets, whose flowing toward the outer peripheral surface 36A side is obstructed by the step portion 34, flow on the border portion between the outer peripheral surface 36B and the wall surface 36C, in accordance with the airflow (the direction and strength of the airflow) in the vicinity of the surface of the outer peripheral surface 36B and the slope of the outer peripheral surface 36B. Note that, in FIG. 1A and FIG. 1B, examples of flows of the water droplets on the outer peripheral surface 36 (the outer peripheral surface 36B) of the outer cover 14 are shown by the dashed line arrows.

Here, the greater the surface area of the outer peripheral surface 36, the greater the amount of the water droplets that stick to the outer peripheral surface 36 of the outer cover 14. However, due to the step portion 34 sectioning the outer peripheral surface 36 of the outer cover 14, the outer peripheral surface 36 that is continuous toward the outer wall 22 is the outer peripheral surface 36A, and the surface area over which water droplets can flow toward the outer wall 22 is reduced. Due thereto, at the imaging device 10, by providing the step portion 34 at the outer cover 14, the amount of water droplets that flow from the outer peripheral surface 36B toward the outer peripheral surface 36A that is at the outer wall 22 side is decreased. Further, at the imaging device 10, because the flowing of water droplets from the outer peripheral surface 36B toward the outer peripheral surface 36A that is at the outer wall 22 side is suppressed, the formation of flow paths of water droplets from the outer peripheral surface 36B toward the outer peripheral surface 36A is suppressed.

Accordingly, at the imaging device 10, the amount of water droplets that reach the edge portion 30 is reduced more than in a case in which the step portion 34 is not provided. The captured images of the camera 12 being spoiled due to water droplets that flow-down from the edge portion 30 onto the surface of the cover glass 28 is suppressed, and it becomes possible to assist proper viewing by a vehicle occupant who is within the vehicle cabin by using the captured images of the camera 12.

In the above-described present embodiment, the step portion 34 is formed so as to be continuous in the vehicle longitudinal direction as seen in a plan view, but the planar shape and the orientation of the step portion are not limited to this. It suffices for the step portion to be a structure that can suppress sticking, to the outer peripheral surface 36A that is at the outer wall 22 side, of the water droplets that flow on the outer peripheral surface 36B that is at the side opposite the outer wall 22.

Figure 3A:
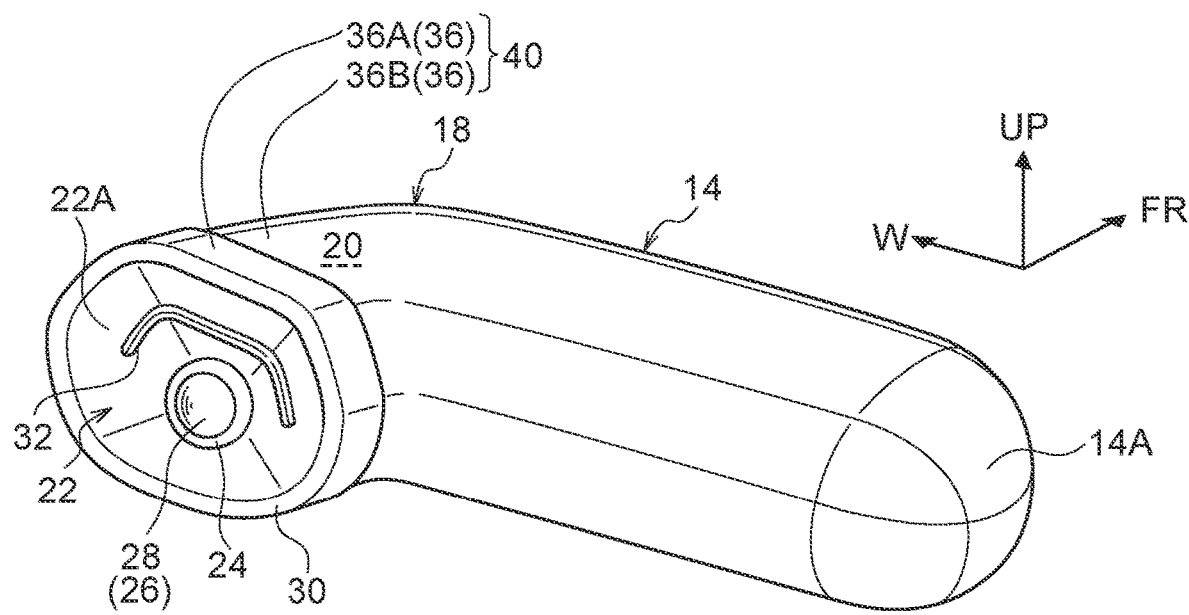
FIG. 3A is a schematic perspective view of main portions, showing another example of the imaging device.
Figure 3B:
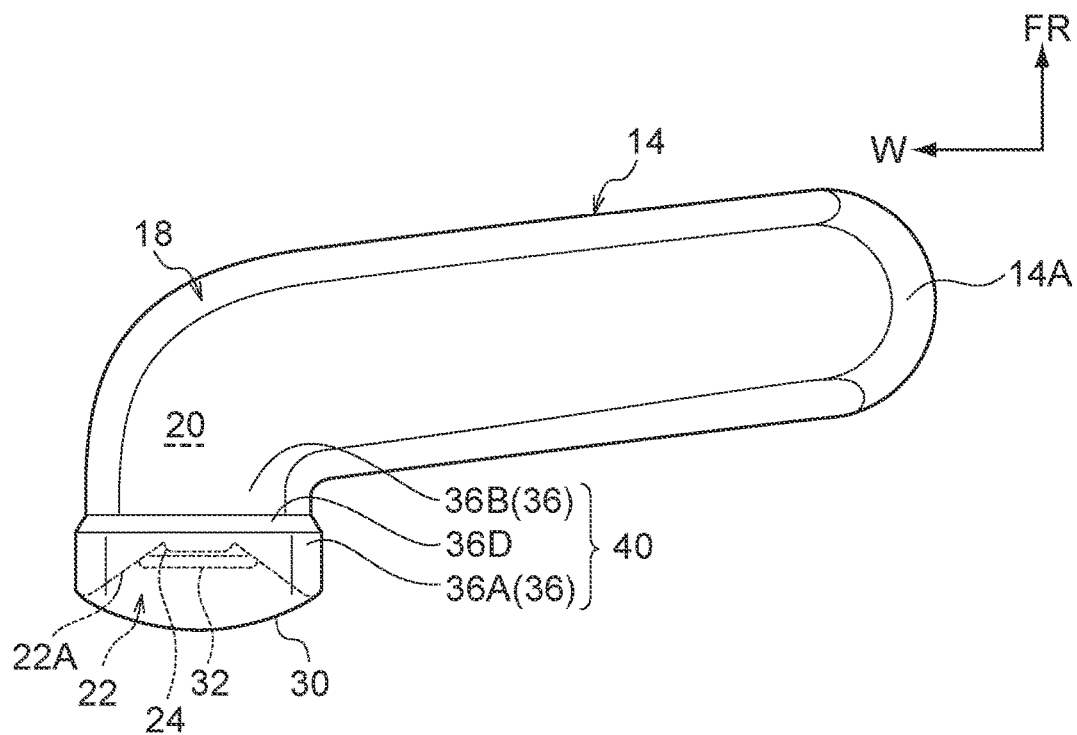
FIG. 3B is a schematic plan view of main portions, showing the other example of the imaging device.

Such a step portion may be a step portion 40 that is shown in FIG. 3A and FIG. 3B. This step portion 40 is formed in the peripheral direction of the outer cover 14, at the outer wall 22 side of the curved portion 18 of the outer cover 14. Further, at the step portion 40, the outer peripheral surface 36B that is at the base portion 14A side of the outer cover 14 is lower than the outer peripheral surface 36A that is at the outer wall 22 side of the outer cover 14, and a wall surface 36D is formed between the outer peripheral surface 36A and the outer peripheral surface 36B such that the outer peripheral surface 36A side is higher, and the outer peripheral surface 36 is sectioned into the outer peripheral surface 36A and the outer peripheral surface 36B by the wall surface 36D. Moreover, the wall surface 36D is formed over the entire periphery of the outer cover 14, and, due thereto, the step portion 40 is provided over the entire periphery of the outer cover 14.

By the wall surface 36D, the step portion 40 suppresses flowing, toward the outer peripheral surface 36A, of water droplets that flow from the outer peripheral surface 36B of the outer cover 14 toward the step portion 40. Further, flowing toward the outer peripheral surface 36A of the water droplets, which flow along the outer peripheral surface 36B that is at the lower side of the outer cover 14 and the outer peripheral surface 36B that is at the sides (the outer peripheral surface 36 as seen from the vehicle longitudinal direction), is reduced due to the step portion 40 being provided over the entire periphery of the outer cover 14. Further, the formation of flow paths of water droplets from the outer peripheral surface 36B toward the outer peripheral surface 36A is suppressed due to the step portion 40 suppressing the flowing of water droplets from the outer peripheral surface 36B of the outer cover 14 toward the outer peripheral surface 36A.

Accordingly, at the imaging device 10 at which the step portion 40 is formed at the outer cover 14, the captured images of the camera 12 being spoiled by water droplets that stick to the outer peripheral surface 36B of the outer cover 14 is suppressed, and, by the captured images of the camera 12, it becomes possible to assist proper viewing by a vehicle occupant who is within the vehicle cabin.

Further, it suffices for the step portion to be provided in the peripheral direction of the outer cover 14, and for the step portion to be provided so as to section the outer peripheral surface of the outer cover 14 into an outer wall 22 side and a side opposite the outer wall 22. The step portion is not limited to the step portion 34 (refer to FIG. 1A and FIG. 1B) that runs along the vehicle longitudinal direction and the step portion 40 (refer to FIG. 3A and FIG. 3B) that runs along the vehicle transverse direction, and the step portion may be provided in a direction that is inclined with respect to the vehicle longitudinal direction and the vehicle transverse direction respectively as seen in plan view, i.e., may be provided so as to be directed in the curvature radial direction at the intermediate portion in the curvature peripheral direction of the curved portion 18.

Further, the step portion may be a shape that is curved as seen in plan view. Namely, the step portion may be provided so as to be curved such that the inner side in the curvature radial direction of the curved portion 18 runs along the vehicle longitudinal direction, and the outer side in the curvature radial direction is directed toward the vehicle transverse direction outer side.

Moreover, in the present embodiments, the step portion 34, 40 is provided at the outer peripheral surface 36 of the outer cover 14. However, the present invention is not limited to this, and, for example, a groove portion or a projecting portion that has the function of the step portion may be formed.

Figure 4A:
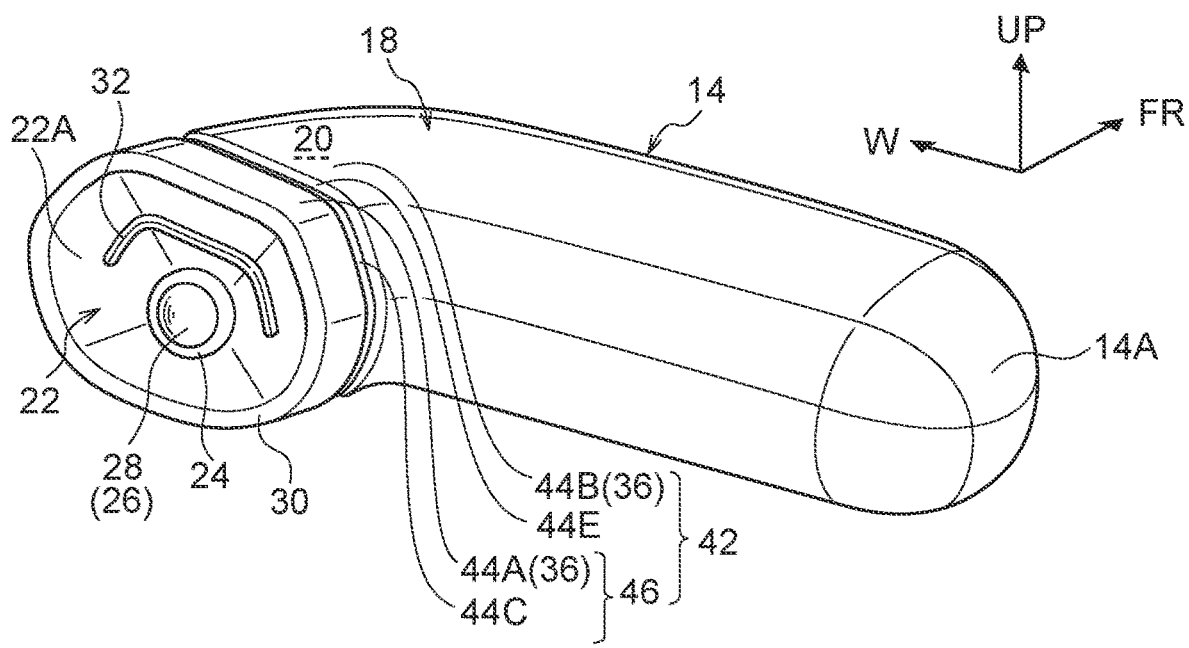
FIG. 4A is a schematic perspective view of main portions, showing another example of the imaging device.
Figure 4B:
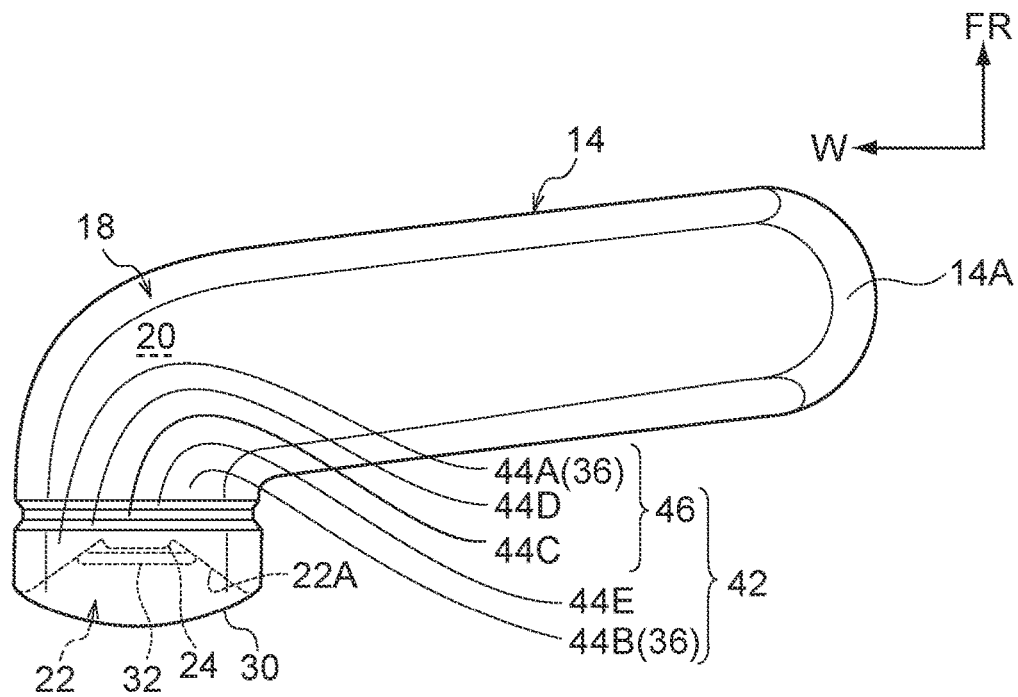
FIG. 4B is a schematic plan view of main portions, showing the other example of the imaging device.

As the groove portion, there may be a groove portion 42 that is shown in FIG. 4A and FIG. 4B. The groove portion 42 is provided at the outer cover 14 in place of the step portion 40 shown in FIG. 3A and FIG. 3B. The groove portion 42 that is shown in FIG. 4A and FIG. 4B is formed in the peripheral direction of the outer cover 14 (the vehicle transverse direction) at the outer wall 22 side of the curved portion 18 of the outer cover 14. At the groove portion 42, an outer peripheral surface 44C, which serves as a groove bottom and is lower than outer peripheral surfaces 44A, 44B, is formed between the outer peripheral surface 44A that is at the outer wall 22 side of the outer cover 14 and the outer peripheral surface 44B that is at the side (the base portion 14A side) opposite the outer wall 22. Further, at the groove portion 42, the outer peripheral surface 44A and the outer peripheral surface 44C are connected by a wall surface 44D, and the outer peripheral surface 44B and the outer peripheral surface 44C are connected by a wall surface 44E.

Moreover, at the groove portion 42, the outer peripheral surface 44C and the wall surfaces 44D, 44E are respectively formed over the entire periphery of the outer cover 14. Namely, the groove portion 42 is provided over the entire periphery of the outer wall 22 side of the outer cover 14.

At this groove portion 42, a step portion 46 is formed by the outer peripheral surface 44A that is at the outer wall 22 side, the outer peripheral surface 44C that is at the side opposite the outer wall 22, and the wall surface 44D. Even if water droplets, which flow on the outer peripheral surface 44B toward the outer wall 22, enter into the groove portion 42 and reach the outer peripheral surface 44C, flowing of the water droplets from the outer peripheral surface 44C toward the outer peripheral surface 44A is suppressed. Due thereto, at the outer cover 14 at which the groove portion 42 is formed, flow paths of water droplets from the outer peripheral surface 44B toward the outer peripheral surface 44A being formed is suppressed. Further, at the groove portion 42, due to the outer peripheral surface 44C and the wall surfaces 44D, 44E respectively being formed over the entire periphery of the outer cover 14, the water droplets, which flow along the outer peripheral surface 44B at the lower side of the outer cover 14 and the outer peripheral surface 44B at the sides (the outer peripheral surface 36 as seen from the vehicle longitudinal direction), flowing on the outer peripheral surface 44A is reduced.

Accordingly, at the imaging device 10 at which the groove portion 42 is provided at the outer cover 14, the amounts of water droplets that stick to the outer peripheral surface 44A that is at the outer wall 22 side, and water droplets that flow on the outer peripheral surface 44A, are reduced. Therefore, the captured images of the camera 12 being spoiled by water droplets is suppressed, and, by the captured images of the camera 12, it becomes possible to assist proper viewing by a vehicle occupant who is within the vehicle cabin.

Note that, in the above description, the outer peripheral surface 44C and the wall surfaces 44D, 44E of the groove portion 42 are provided at the outer wall 22 side of the curved portion 18 of the outer cover 14. However, the groove portion is not limited to this. At the groove portion, the wall surface 44D may be formed at the outer wall 22 side of the curved portion 18 (a position corresponding to the step portion 40 in FIG. 3A and FIG. 3B), and the wall surface 44E may be provided at the side opposite the outer wall 22 of the curved portion 18 (a position corresponding to the step portion 34 in FIG. 1A and FIG. 1B), and the outer peripheral surface of the curved portion 18 may be made to be the outer peripheral surface 44C of the groove portion 42.

Further, although the step portion 40 and the groove portion 42 are provided over the entire periphery of the outer cover 14, the present invention is not limited to the step portion 40 and the groove portion 42, and the step portion 34 (refer to FIG. 1A and FIG. 1B) may be provided over the entire periphery of the outer cover 14. Moreover, a projecting portion that structures a step portion may be provided at the outer peripheral surface 36 of the outer cover 14 instead of the step portion 34 (refer to FIG. 1A and FIG. 1B), the step portion 40 (refer to FIG. 3A and FIG. 3B), or the groove portion 42 (refer to FIG. 4A and FIG. 4B).

Further, in the above description, it is described that any one of the step portions 34, 40 and the groove portion 42 is provided at the outer cover 14, but the present invention is not limited to this. For example, the step portion 34 (refer to FIG. 1A and FIG. 1B) and the step portion 40 (refer to FIG. 3A and FIG. 3B), or the step portion 34 and the groove portion 42 (refer to FIG. 4A and FIG. 4B), may be provided at the outer cover 14. Further, the present invention is not limited to the above-described combinations, and a structure, in which two or more of the same type or different types selected from a step portion, a groove portion and a projecting portion, may be provided as a plurality in the length direction of the outer cover 14. Due thereto, flowing of water droplets toward the outer wall can be suppressed reliably as compared with a case in which one of a step portion, a groove portion and a projecting portion is provided.

Further, the present embodiment describes, as an example, the outer cover 14 at which the curved portion 18 that serves as a bent portion is formed, and whose length direction is bent. However, the outer peripheral member does not have to be a shape whose length direction is bent. In this case, it suffices for the outer wall to be provided such that the imaging portion is directed in the imaging direction of the imaging portion. Namely, in a case of imaging the vehicle rear side, it suffices for the outer wall to be provided at the surface that is at the vehicle rear side of the outer peripheral member whose axis is rectilinear, and it suffices for the step portion to be provided along the peripheral direction of the outer peripheral member at a position that is on the outer peripheral surface of the outer peripheral member and that is at the side opposite the outer wall in the axial direction of the outer peripheral member.

Moreover, in the above description, the step portions 34, 40 and the groove portion 42 that serve as the step portion relating to the present invention are provided at the curved portion 18 of the outer cover 14 at which is provided the imaging portion 20 that houses the camera 12. The step portion relating to the present invention can be provided at the outer peripheral surface 36 of the outer cover 14 within the range of the imaging portion 20, or can be provided at the outer peripheral surface 36 of the outer cover 14 at the periphery of the imaging portion 20.

Further, although the imaging device 10 that is provided at the side door 16A of the vehicle 16 is used in the above description, the imaging device may be provided, for example, at the roof, the trunk, the bumper or the like of a vehicle, and may be provided to assist viewing of the vehicle rear side. Further, the imaging device is not limited to being provided at a passenger vehicle, and can be provided at an arbitrary vehicle and applied to the imaging of the vehicle rear side.

The disclosure of Japanese Patent Application No. 2015-248899 that was filed on Dec. 21, 2015 is, in its entirety, incorporated by reference into the present specification.

The invention claimed is:

1. An imaging device comprising:
an imaging portion provided at a vehicle exterior;
an outer peripheral member having an outer wall at which a light transmitting portion is disposed, and that houses the imaging portion that captures images via the light transmitting portion; and
a step portion that is provided at an outer peripheral surface of the outer peripheral member, and that causes the outer peripheral surface of the outer peripheral member that is at the outer wall side to protrude-out further than the outer peripheral surface of the outer peripheral member that is at a side opposite the outer wall,
wherein a bent portion, which is bent such that the outer wall is directed toward a vehicle rear side, is formed at the outer peripheral member, and
wherein the step portion is provided over an entire periphery of the outer peripheral surface of the outer peripheral member.

2. The imaging device of claim 1, wherein at least one of a groove portion or a projecting portion that structures the step portion is provided at the outer peripheral member.

3. The imaging device of claim 1, wherein the outer peripheral member is shaped as a tube whose interior is hollow.

4. The imaging device of claim 1, wherein a curved portion, at which a length direction of the outer peripheral member is bent, is formed.

5. The imaging device of claim 1, wherein the step portion is provided at the bent portion of the outer peripheral member.

6. An imaging device comprising:
an imaging portion provided at a vehicle exterior;
an outer peripheral member having an outer wall at which a light transmitting portion is disposed, and that houses the imaging portion that captures images via the light transmitting portion; and
a step portion that is provided at an outer peripheral surface of the outer peripheral member, and that causes the outer peripheral surface of the outer peripheral member that is at the outer wall side to protrude-out further than the outer peripheral surface of the outer peripheral member that is at a side opposite the outer wall,
wherein a bent portion, which is bent such that the outer wall is directed toward a vehicle rear side, is formed at the outer peripheral member, and the step portion is provided at the bent portion of the outer peripheral member, and
wherein the step portion is elongated along a direction toward the outer wall.

7. The imaging device of claim 6, wherein the imaging device is provided on each side of the vehicle.

8. An imaging device comprising:
an imaging portion provided at a vehicle exterior;
an outer peripheral member having a first portion directed toward a side of the vehicle, and a bent portion having an outer wall at which a light transmitting portion is disposed, and that houses the imaging portion that captures images via the light transmitting portion; and
a step portion that is provided at an outer peripheral surface of the outer peripheral member, and that is formed so as to be continuous in a peripheral direction of the outer peripheral surface,
wherein the outer peripheral surface is at a vehicle upper side and is divided by the step portion into a first outer peripheral surface that is at an outer wall side, and a second outer peripheral surface that is at a base portion side of the outer peripheral member, which is a side opposite from the outer wall,
wherein the first outer peripheral surface protrudes out further than the second outer peripheral surface, and
wherein the bent portion, which is bent such that the outer wall, in a state which the imaging portion is provided at the vehicle exterior, is directed toward a vehicle rear side, and the step portion is provided at the bent portion of the outer peripheral member.

9. The imaging device of claim 8, wherein the outer peripheral member is shaped as a tube whose interior is hollow.

10. The imaging device of claim 8, wherein a curved portion, at which a length direction of the outer peripheral member is bent, is formed.

11. A vehicle with an imaging device according to claim 8 provided on each side of the vehicle, wherein the step portion is formed along a direction toward the outer wall.

12. An imaging device comprising:
an imaging portion provided at a vehicle exterior;
an outer peripheral member having an outer wall at which a light transmitting portion is disposed, and that houses the imaging portion that captures images via the light transmitting portion; and
a step portion that is provided at an outer peripheral surface of the outer peripheral member, and that is formed so as to be continuous in a peripheral direction of the outer peripheral surface,
wherein the outer peripheral surface is divided by the step portion into a first outer peripheral surface that is at an outer wall side, and a second outer peripheral surface that is at a base portion side of the outer peripheral member, which is a side opposite from the outer wall,
wherein one of the first and second outer peripheral surfaces protrudes out further than the other of the first and second peripheral surface, and
wherein a bent portion, which is bent such that the outer wall, in a state which the imaging portion is provided at the vehicle exterior, is directed toward a vehicle rear side, is formed at the outer peripheral member, and the step portion is provided closer to the outer wall side of the outer peripheral member than the bent portion.

13. The imaging device of claim 12, wherein at least one of a groove portion or a projecting portion that structures the step portion is provided at the outer peripheral member.

14. The imaging device of claim 12, wherein the outer peripheral member is shaped as a tube whose interior is hollow.

15. The imaging device of claim 12, wherein a curved portion, at which a length direction of the outer peripheral member is bent, is formed.

* * * * *